Nov. 6, 1962 L. W. BILLS 3,062,055
AUTOMATIC FLUID SAMPLER
Filed July 13, 1959 3 Sheets-Sheet 1
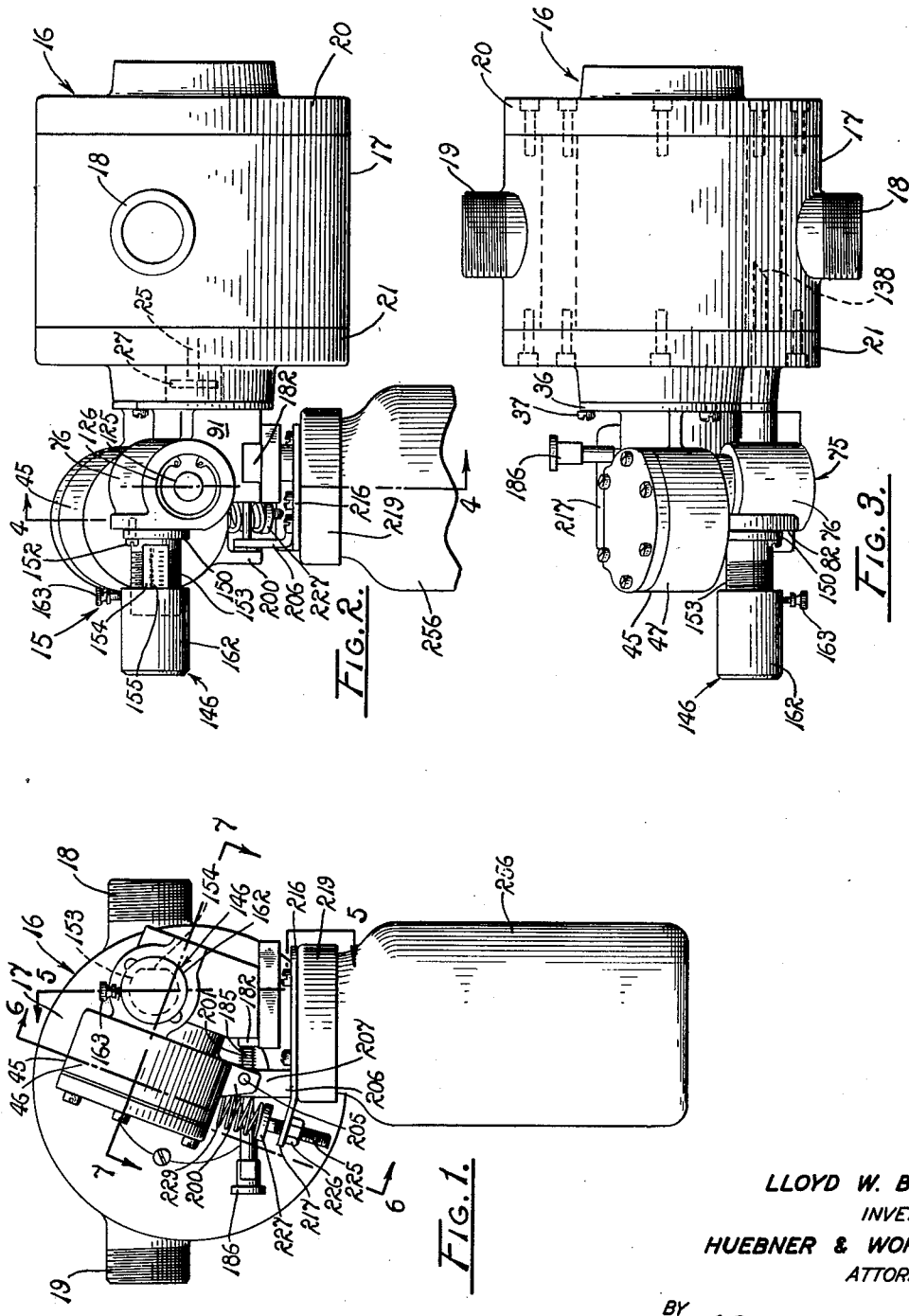
LLOYD W. BILLS
INVENTOR
HUEBNER & WORREL
ATTORNEYS Nov. 6, 1962
L. W. BILLS
3,062,055
AUTOMATIC FLUID SAMPLER
Filed July 13, 1959
3 Sheets-Sheet 2
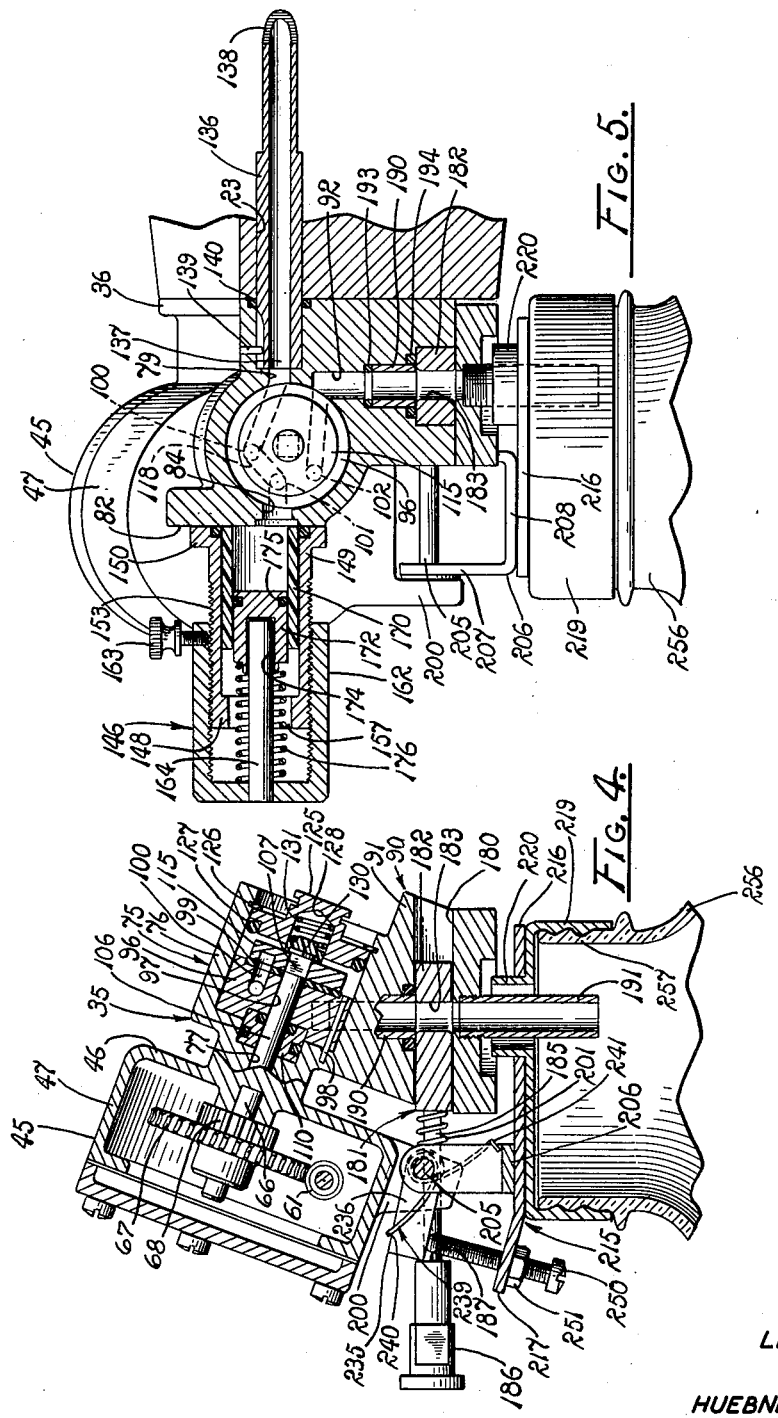
LLOYD W. BILLS
INVENTOR
HUEBNER & WORREL
ATTORNEYS
BY Nov. 6, 1962     L. W. BILLS     3,062,055
AUTOMATIC FLUID SAMPLER Filed July 13, 1959     3 Sheets-Sheet 3

LLOYD W. BILLS
INVENTOR
HUEBNER & WORREL
ATTORNEYS

United States Patent Office 3,062,055
Patented Nov. 6, 1962

3,062,055
AUTOMATIC FLUID SAMPLER
Lloyd W. Bills, Downey, Calif., assignor to Flow Equipment Co., Inc., Santa Fe Springs, Calif., a corporation of California
Filed July 13, 1959, Ser. No. 826,599
9 Claims. (Cl. 73—422)

The present invention relates to an automatic fluid sampler and more particularly to a sampler for receiving fluid samples from a fluid flow system under high pressure and accumulating said samples under reduced pressure until a predetermined quantity is obtained.

In many fluid flow systems, such as in an oil well pumping unit, it is ordinarily desirable at various times to test and to check the characteristics of the fluid passing through the system. In oil well units, for example, a careful check of the gravity of the oil is maintained, of its water content and of other impurities contained therein.

Several problems arise in taking such samples. First of all, it is desirable to collect such samples at atmospheric pressure in glass containers which can be easily and quickly removed periodically for submission to laboratory check. However, such containers cannot accept the fluid at the usually high pressures in such fluid flow systems.

Further, oil wells and other flow systems frequently pump corrosive materials and solid particles along with the primary fluid. Therefore, devices for accepting samples must operate smoothly, accurately, and without interruption notwithstanding existence of such foreign substances in the fluid being sampled.

Additionally, such sampling apparatus must be capable of limiting the amount of fluid collected in such glass containers. That is, the fluid must not overflow the container because a portion of the sample would thereby be lost and the sample rendered inaccurate. In oil well sampling, for example, the light portions of the fluid float to the top and are lost during any such overflow thereby impairing the accuracy of the sample.

With the foregoing in mind, therefore, it is an object of the present invention to provide an improved automatic fluid sampler.

Another object is to provide a sampler for receiving fluid samples under high pressure from a fluid flow system and subsequently releasing such samples under reduced or atmospheric pressures.

Another object is to enable more accurate sampling of fluid in a fluid flow system.

Another object is to enable collection of fluid samples in a glass container under atmospheric pressure notwithstanding the fluid collected is initially under high pressure.

Another object is to provide a sampler of the general character described in which the quantity of samples accumulated is limited to a predetermined adjustable amount.

Another object is to provide an improved high pressure fluid accumulator.

Other objects and advantages are to provide improved elements and arrangements thereof in a device of the character and for the purposes set forth which is economical, durable and fully effective in accomplishing its intended purposes.

Further objects and advantages will become apparent in the subsequent description in the specifications.

In the drawings:

FIG. 1 is a side elevation of a sampling apparatus embodying the principles of the present invention attached to a fluid flow meter.

FIG. 2 is a fragmentary side elevation of the sampling apparatus and meter, as viewed from a position at the right of FIG. 1.

FIG. 3 is a top plan view of said apparatus and meter.

FIG. 4 is a somewhat enlarged transverse section taken on line 4—4 of FIG. 2.

FIG. 5 is a somewhat enlarged fragmentary transverse section taken on line 5—5 of FIG. 1 and showing a sampling valve in a sample accumulating position.

Figure 6:
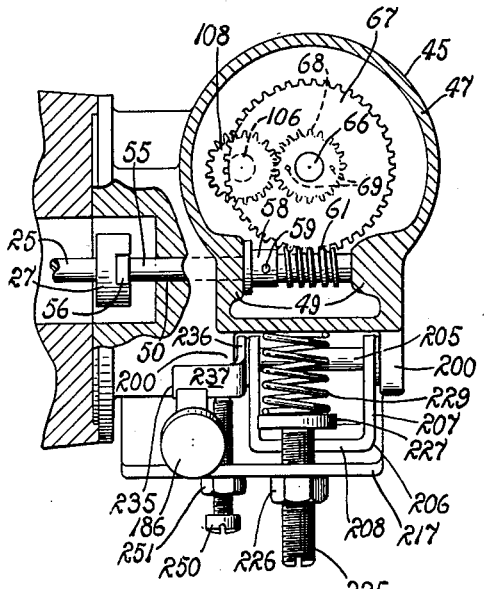
FIG. 6 is a somewhat enlarged fragmentary transverse section taken on line 6—6 of FIG. 1.

Referring more particularly to the drawings, a sampling apparatus embodying the principles of the present invention is generally indicated by the numeral 15. The subject apparatus is adapted for connection to a fluid flow meter generally indicated by the numeral 16, and of the type shown and described in United States Patent No. 2,738,775. For the purpose of the present disclosure, this flow meter includes a generally cylindrical housing 17, best seen in FIGS. 2 and 3, having an inlet 18, an outlet 19 in circumferentially spaced relation to the inlet about the housing and in substantially axial alignment with the inlet on the opposite side of the housing, an end wall 20, and an opposite end wall 21, the latter end plate providing a probe receiving bore 23, best shown in FIG. 5, extended into the interior of the housing and opening out through said opposite end wall. An elongated drive shaft 25 is rotatably mounted concentrically within the housing 17 and, as best seen in FIG. 6, a female drive coupling 27 is secured to the end of the drive shaft adjacent to the end wall 21. The drive shaft is rotated incident to the passage of fluid through the housing by way of the inlet and the outlet thereof, all in a manner which is known in the art and particularly described in the above cited patent.

The sampling apparatus 15 of the present invention includes a body 35 which is preferably an integral casting. As best seen in FIGS. 1, 2, 3, and 5, the body provides a substantially circular mounting plate 36 fitted in substantially congruent relation against the end wall 21 of the flow meter 16 and secured thereto by means of bolts 37.

Figure 7:
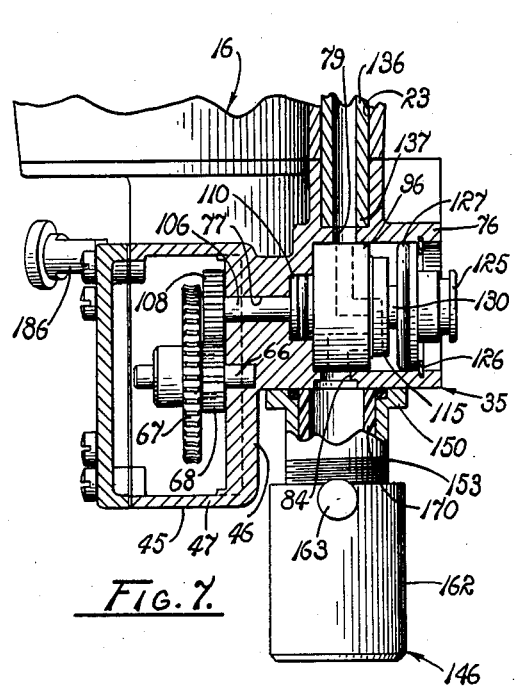
FIG. 7 is a somewhat enlarged fragmentary transverse section taken on line 7—7 of FIG. 1.
Figure 8:
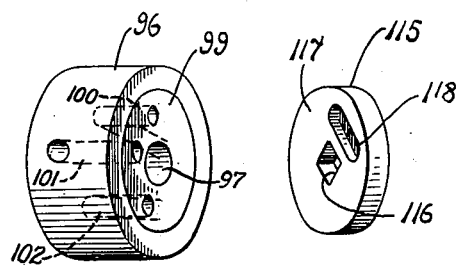
FIG. 8 is a somewhat enlarged exploded perspective of the sampling valve block and the valve head.

With reference to FIGS. 4, 6 and 7, it is evident that the body 35 also includes a substantially cylindrical gear box 45 having a back wall 46 and an annular side wall 47 providing an opening opposite to the back wall. As illustrated in FIG. 6, spaced bearings 49 are formed in the side wall of the gear box in axial alignment, and an elongated bore 50 is axially extended from one of these bearings through the body and opens through the mounting plate 36 thereof in axial alignment with the drive shaft 25.

An elongated driven shaft 55 is rotatably journaled in the bearings 49 and rotatably extended through the bore 50. A male coupling 56 is connected to the end of the driven shaft extended through the mounting plate and this male coupling is releasably fitted into the female drive coupling 27 on the drive shaft so that the driven shaft is connected for rotation with the drive shaft. A thrust collar 58 is connected to the driven shaft by means of a pin 59 and between the bearings. This coupling is in engagement with one of the bearings and prevents axial movement of the driven shaft toward the drive shaft. A worm 61 is provided on the driven shaft between the bearings.

With continued reference to FIGS. 4, 6 and 7, an elongated spindle 66 is rigidly and generally concentrically extended from the back wall 46 of the gear box 45. A circular worm wheel 67 is freely rotatably mounted on the spindle in mesh with the worm 61. A drive gear 68 is coupled to the worm wheel by means of a pair of pins 69 extended from the drive gear and fitted into sockets in the worm wheel.

The sampling apparatus 15 of the present invention also includes a sampling valve, generally indicated by the numeral 75 and best illustrated in FIGS. 4, 5, 7 and 8. The sampling valve includes a substantially cylindrical housing 76, which is a part of the body 35, and an elongated bore 77, concentric with the housing, is extended from the housing through the body into the gear box 45 eccentrically of the spindle 66. The body 35 also provides an elongated bore 79 opening into the valve housing 76 and extended through the mounting plate 36 in axial alignment with the probe bore 23 in the fluid flow meter 16. As illustrated in FIG. 5, the body provides an accumulator mounting face 82 adjacent to the valve housing, and a bore 84, generally diametrically opposed to the bore 79, opens from the housing into the mounting face.

Before completing description of the sampling valve 75, reference is briefly made to a container valve 90 which is formed in the body 35 and includes a housing 91 providing an elongated bore 92 having an upper end opening into the sampling valve housing 76 and a lower end opening exteriorly of the body. The bores 79, 84, 92 open into the valve housing in circumferentially spaced relation thereabout, as seen in FIG. 5.

Returning to the description of the sampling valve 75, the valve also provides a substantially cylindrical block 96 having an elongated bore 97 concentric to the housing and therefore coaxial with the bore 77. The block is connected within the housing against rotation by means of an elongated pin 98. The block includes a circular bearing disc 99 preferably of a hard wearing plastic, such as Teflon, a fluid inlet port 100 in fluid communication with the inlet bore 79, an accumulator outlet port 101 in fluid communication with the outlet bore 84, and a container outlet port 102 in fluid communication with the outlet bore 92. These ports all extend through the disc 99 and thus have open ends in substantially equally circumferentially spaced relation about the disc and in substantially equally radially spaced relation to the bore 97.

The sampling valve 75 also includes an elongated valve shaft 106 rotatably journaled in the bore 77 having an end extended into the gear box 45, as best seen in FIG. 6, and an opposite end portion rotatably extended through the valve block 96 and terminating in a non-circular end 107. A driven gear 108 is rigidly connected to the end of the valve shaft within the gear box and this gear is in mesh with the drive gear 68. Suitable packing 110 is mounted within the valve housing 76 in fluid sealing relation about the valve shaft.

A circular valve head 116 provides a square hole 116 centered therein and fitted on the end 107 of the valve shaft 106. The head has an inner face 117 in rotatable facing engagement with the disc 99 of the valve block 96. The valve head has an elongated slot 118 in the inner face thereof of a length slightly greater than the distance between a pair of adjacent open ends of the ports 100, 101 and 102, but less than twice this distance. Further, this slot has a longitudinal center line which is substantially tangential to a circle having a radius substantially equal to the radial distance of each of the open ends of the ports from the bore 97. Therefore, it will be evident that the valve head is movable relative to the valve block 96 between a fluid accumulating position wherein the slot overlays and therefore interconnects the fluid inlet port 100 and the accumulator outlet port 101 (and in which position the container outlet port 102 is closed), all as illustrated in FIG. 5, and a fluid releasing position wherein the slot overlays and therefore interconnects the accumulator and container outlet ports 101 and 102 (and in which position the fluid inlet port 100 is closed, which position is not illustrated in the drawings). A circular cap 125 is releasably fitted in the outer open end of the valve housing 76 and is held in position by means of a lock washer 126. The cap mounts an annular O-ring 127 in fluid sealing engagement with the housing. The cap has a concentric socket 128 axially aligned with the driven valve shaft 106. A shaft holder or bearing 130, preferably of Teflon, releasably receives the end 107 of the valve shaft, and a compression spring 131 is fitted in the socket and bears against the holder so that the valve shaft is yieldably resiliently urged inwardly of the valve housing.

With reference to FIGS. 5 and 7 an elongated tubular probe 136 provides a discharge end 137 releasably slidably fitted in the outlet bore 79 and an inlet end extended through the probe bore 23 in the flow meter 16 into the housing 17 between the inlet 18 and outlet 19 thereof so as to be in the path of fluid traveling through the meter. The inlet end has a beveled face 138 which is disposed toward the inlet 18 of the housing in much the same manner as a pitot tube. A pin 139 interconnects the body 35 and the probe for preventing rotation of the probe in the bores. Preferably, an annular O-ring seal 140 is mounted in the body in circumscribing fluid-tight engagement with the probe.

The sampling apparatus of the present invention further includes an accumulator, generally indicated by the numeral 146, and best illustrated in FIG. 5. The accumulator is separable from the body 35 and itself includes a cylindrical body 148 having an inner end 149 providing a mounting flange 150 fitted against the accumulator mounting face 82 and connected to the body by means of bolts 152. This accumulator body has an externally screw-threaded portion 153 and the latter portion has an elongated, longitudinally extended external flat surface 154 on which is provided suitable indicia 155 spaced axially along said flat surface and visible externally of the sampling apparatus. The accumulator body also has an outer open end 157.

In addition, the accumulator 146 provides a substantially cylindrical cap 162 which is screw-threadably connected to the body 148 for adjustment axially thereof. A set screw 163 is extended radially through the cap for engagement with the flat surface 154 of the body thereby to secure the cap in selected positions axially of the body. An elongated stop rod 164 is connected to the cap and extended axially thereof through the open end 157 into the body 148.

Still further, the accumulator 146 provides a cylinder 170, preferably of a hard wearing plastic, such as Teflon, and which is press-fit into the body 148 adjacent to the inner end 149 thereof and thereby secured against axial movement within the body. A cylindrical piston 172 is slidably fitted within the cylinder and has a concentric bore 174 opening toward and adapted to receive the stop rod 164 incident to sufficient outward movement of the piston within the cylinder. An O-ring 175 circumscribes the piston and is in slidable fluid-tight engagement with the cylinder. An elongated compression spring 176 circumscribes the stop rod and has an outer end bearing against the cap 162 and an inner end bearing against the piston 172 for yieldably urging the piston inwardly of the cylinder and therefore toward the mounting face 82. From the foregoing it will be evident that the cylinder 170 is adapted to receive fluid from the outlet port 101 whereby this fluid, if under pressure, will force the piston 172 outwardly in the cylinder to compress the spring 176. It will further be evident that by adjusting the cap 162 axially on the cylinder, the compression of the spring can be adjusted. However, even more significantly, the cap carries the stop rod 164 with it and thus, adjustment of the cap adjustably positions the stop rod and regulates the capacity of the accumulator by limiting travel of the piston 172. The amount of capacity can be selected by reference to the indicia 155.

With particular reference to FIGS. 4 and 5, it will be noted that the subject invention includes a container valve as briefly referred to above and indicated by the numeral 90. The housing 91 of this valve provides an elongated slide-way 180 extended transversely of the bore 92, in fluid communication therewith, and of rectangular cross section. An elongated container valve member 181 includes a valve head 182 of rectangular cross section slidably complementarily fitted into the slide-way and providing a valve port 183 adapted for axial alignment with the bore 92 when the valve head is in open position, as illustrated in FIG. 4. The valve member also includes an elongated cylindrical stem 185 rigidly axially extended from the valve head, and a handle 186 connected to the stem and, because of its increased diameter with relation to the stem, providing an inner shoulder 187. Upper and lower tubes 190 and 191 are fitted into the bore 92 above and below the slide-way with the lower tube extended downwardly below the container valve housing 91 and preferably being screw-threadably connected into the bore 92. Suitable O-ring fluid seals 193 and 194 are provided in the container valve housing between the housing and the upper tube for preventing leakage around the upper tube and into the slide-way above the valve head 182. In addition to its open position, the valve member also has a closed position wherein the port 183 is out of alignment with the bore 92 and therefore the bore 92 is closed to fluid passage therethrough.

The body 35 includes a pair of spaced ears 200 extended downwardly from the gear box 45 in spaced relation to the container valve housing 91. The valve stem 185 is slidably extended through one of these ears, and a coiled compression valve spring 201 circumscribes the valve stem and has opposite ends bearing against this ear and the valve head 182. The purposes of the spring is yieldably to urge the valve head into closed position. An elongated mounting pin 205 is mounted in and extended between the ears 200. An upwardly disposed U-shaped bracket 206 provides arms 207 rotatably supported on the pin 205 relatively adjacent to the ears, and a central flange 208 interconnecting the arms in downwardly spaced relation to the pin.

A generally rectangular mounting plate 215 includes a relatively large main portion 216 and a relatively narrow flange 217 obtusely angularly extended relative to the main portion. The central flange 208 of the bracket 206 is secured, as by welding, to the main portion of the mounting plate adjacent to the flange 217 and so that the flange 217 extends upwardly relative to the main portion. A container cover 219 is also secured, as by welding, to the main portion 216 of the mounting plate. The cover has an upwardly extended annular spout 220 extended through an opening in the main portion of the plate and concentrically receiving the lower tube 191 in circumscribing circumferentially spaced relation thereto.

With particular reference to FIGS. 1 and 6, an elongated externally screw-threaded bolt 225 is screw-threadably extended through the flange 217 and provides a lock nut 226 turned down against the under side of the flange. The bolt has an upper end on which is secured, as by welding, a circular disc 227. A coiled container supporting compression spring 229 provides an upper end secured, as by welding, to the side wall 47 of the gear box 45 and a lower end secured by the disc 227 and yieldably urging the mounting plate 215 to pivot in a counterclockwise direction, as viewed in FIG. 4, about the mounting pin 205.

An L-shaped latch 235, best illustrated in FIGS. 4 and 6, includes a mounting arm 236 rotatably mounted on the pin 205 adjacent to the inner ear 200 and outwardly of the inwardly disposed arm 207 of the bracket 206. The latch also has a latching arm 237 substantially right-angularly extended relative to the mounting arm and in engagement with the valve member 181. More specifically, when the valve member 181 is in closed position, the latching arm simply rests on the handle 186 adjacent to the outermost end of the valve member. However, when the valve member is pulled outwardly against the urgence of the valve spring 201 and into open position, as viewed in FIG. 4, the latching arm moves downwardly onto the valve stem 185 and into engagement with the shoulder 187 thereby releasably to hold the valve member in its open position. A spring 239 is extended about the mounting pin and provides upper and lower ends 240 and 241, respectively, bearing downwardly against the latching arm and outwardly against an arm of the U-shaped bracket for yieldably urging the latching arm downwardly into engagement with the valve member 181. Therefore, whenever the valve member is pulled into its open position, the latching arm automatically is forced into its latching position in engagement with the shoulder. This position is shown in FIG. 4.

An elongated trigger bolt 250 is screw-threadably extended through the flange 217 of the mounting plate 125 in longitudinally spaced relation to the bolt 225 and has an upper end engageable with the latching arm 237. A lock nut 251 is screw-threaded on the trigger bolt and is turned upwardly against the under side of the flange 217. It will be evident that when the valve member 181 is latched in its open position, movement of the mounting plate 215 in a clockwise direction about the mounting pin 205, as viewed in FIG. 4, will move the trigger bolt upwardly against the latching arm 237 to release the latch and cause the valve member to snap into its closed position under the urgence of the spring 201.

A preferably transparent container 256, such as of glass, provides an upper externally screw-threaded neck 257 which is screw-threadably connected to the cover 219. It will be noted that the lower tube 191 extends downwardly within the container when the latter is connected to the cover as described. Also, it will be evident from FIGS. 1 and 2 that the apparatus is intended to be supported on a flow meter 16 so that the container 256 is in a generally upright position.

Operation

The operation of the described embodiment of the subject invention is believed to be readily apparent and is briefly summarized at this point.

With fluid flowing through the meter 16, the drive shaft 25 is rotated thereby to rotate the worm 61, the worm wheel 67, the drive gear 68, the driven gear 108, and the valve head 115.

When the sampling valve 75 is in its fluid receiving position, that is, with the slot 118 interconnecting the inlet port 100 and the outlet port 101, fluid under high pressure in the flow meter 16 passes through the probe 136, the inlet bore 79, the connected ports 100 and 101, and into the cylinder 170 of the accumulator 146. This pressure may be as high as several thousand pounds per square inch.

Inasmuch as the valve shaft 106 is rotated in a counterclockwise direction, as viewed in FIG. 5, and is continuously thus rotated as long as fluid passes through the flow meter 16, the sampling valve 75 remains in fluid receiving position only momentarily to collect a sample of the fluid from the flow meter in the accumulator 146. Shortly thereafter, the sampling valve moves into its fluid releasing position, that is, with the slot 118 interconnecting the outlet ports 101 and 102. In this position, the accumulator releases the sample of fluid through the interconnecting ports 101 and 102 and the outlet bore 92, the port 183 in the open valve 90 and through the lower tube 191 into the container 256. The pressure with which the fluid is released from the accumulator is of course controlled by the spring 176 and is greatly reduced from the pressure with which the fluid is received by the accumulator, a relatively weak spring preferably being utilized.

As the valve head 115 continues to rotate, the sampling valve successively moves from its fluid receiving position to its fluid releasing position whereby samples of fluid from the flow meter 16 are successively taken into the accumulator 146 and successively released from the accumulator into the container 256.

When a predetermined amount of fluid has been released into the container 256, the weight thereof causes the container to pivot about the mounting pin 205 against the urgence of the balancing spring 229. This releases the latch 235 and the container valve 90 moves into its closed positions shutting off further flow of fluid from the accumulator into the container. Thereafter, as the valve head 115 continues to rotate, samples of fluid are taken into the accumulator 146 up to the limit of the spring 176. However, none of this fluid is released into the container since the container valve is closed. At the proper time, the container can be removed and replaced with a new container whereupon the container valve 90 can be opened, as before and the operation repeated.

Several adjustments can be made in the subject sampling apparatus 15. The pressure at which the accumulated fluid is released to the container 256 can be adjusted by axially adjusting the cap 162 of the accumulator 146. That is, by adjusting the cap inwardly on the cylinder 170, the pressure of release can be increased, and by adjusting the cap outwardly on the cylinder, the pressure can be reduced. This also regulates the capacity of the accumulator. Further, the weight at which the container valve 90 closes can be adjusted by loosening the lock nut 226 and threading the bolt 225 either upwardly or downwardly relative to the flange 217. If the bolt is screwed upwardly so as to increase the compression to the spring 229, it will require greater weight in the container to trigger the latch 235 and close the container valve 90. A further adjustment may be required. Thus, by loosening the lock nut 251, the trigger bolt 250 can be adjusted upwardly and downwardly in the flange 217 so as to engage the latching arm 237 properly.

From the foregoing it will be evident that a sampling apparatus has been provided which basically enables samples of fluid automatically to be taken from a fluid flow line wherein the fluid is under high pressures. Inasmuch as the container for receiving the fluid cannot accept the fluids under the high pressures in the fluid flow meter, or other line, the subject apparatus acts as a buffer between the high pressure in the line and the requirement of low pressure in the container by receiving the fluid under high pressure and releasing it to the container under low pressure. The apparatus enables control of the pressure at which the fluid is released as well as control of the amount of fluid which is collected in the container. The apparatus is automatically shut off when the proper amount of fluid has been received.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. An automatic sampler for flowing fluids under pressure comprising a rotatable valve assembly having an inlet port, a first outlet port and a second outlet port, said assembly during rotation being adapted sequentially to interconnect the inlet port and the first outlet port while closing the second outlet port, to interconnect the first and second outlet ports while closing the inlet port, and to close all ports; conduit means connecting the inlet port to a source of said flowing fluids under pressure; an accumulator connected in fluid communication to the first outlet port, said accumulator having a chamber adapted to receive fluid under pressure and containing resilient means compressed by subjection to fluid pressure as said fluid is received by the chamber and maintaining the fluid in the chamber subsequent to filling under a pressure substantially less than the receiving pressure; a sample receiving container connected in fluid communication with the second outlet port of the valve assembly and being open to atmospheric pressure; drive means connected to the valve assembly for rotating said assembly through the sequential positions of port interconnection and closing; a container valve connected between the container and the outlet port of the valve assembly; and means responsive to the extent of sample reception by the container for closing the container valve upon reception by the container of a predetermined extent of sample fluid.

2. The sampler of claim 1 in which the accumulator comprises a substantially horizontal cylindrical body having opposite ends, a substantially cylindrical bore longitudinally extended therethrough and an external screw-threaded portion, a cap screw-threadably mounted on the screw-threaded portion of the body over an end of the bore thereof, a spring positioned in the bore, a piston slidably mounted in the bore with the spring under adjustable pressure between the cap and the piston, and means for connecting the end of the body opposite to the cap in substantially fluid tight relation to the conduit means said conduit means including a probe extended from the inlet port in substantial alignment with the body of the accumulator.

3. The sampler of claim 1 wherein the accumulator includes a longitudinal tubular body having an elongated axis, an inlet connected in fluid-tight relation to said first outlet port and an open end opposite to said inlet, a cap connected to the body for adjustable axial movement on the body in closing relation to said opposite end of the body, a piston, means mounting the piston in the body for reciprocal movement axially of the body toward and from said inlet of the body, means mounted in the cap engageable with the piston for limiting reciprocal movement of the piston away from the inlet port of the body, resilient means mounted within the body and the cap between the piston for yieldably urging the piston toward the inlet port of the body, the cap outwardly overlying the body and the exterior of the body providing indicia longitudinally therealong whereby visual reference to the cap and indicia permits adjustment precisely to regulate the extent of piston travel and effective force of the resilient means.

4. An accumulator comprising a substantially cylindrical body having opposite ends, a bore longitudinally therethrough, and an external screw-threaded end portion; a cap screw-threadably mounted on the body over an end thereof; a cylindrical liner mounted in the bore having an end in spaced relation to the cap providing an enlarged chamber adjacent to the cap; a stop borne by the cap and extended into the bore of the body; a piston slidably mounted in the liner engageable by the stop to preclude travel of the piston toward the cap beyond the liner; a spring extended between the piston and the cap; and means at the end of the body opposite to the cap for connecting said end of the body to a source of fluid under pressure.

5. An apparatus, for automatically taking fluid samples from a fluid flow meter connected in a fluid flow system and including a drive shaft rotated incident to passage of fluid through the meter, comprising an accumulator adapted to receive fluid samples under high pressure from the fluid flow meter and to discharge such fluid samples under pressure lower than said high pressure; a container for receiving fluid samples under low pressure from the accumulator; a sampling valve adapted to be mounted on the flow meter including an inlet port adapted to be connected in fluid communication with the flow meter and an accumulator outlet port connected in fluid communication with the accumulator, a container outlet port connected in fluid communication with the container, a rotatable valve shaft adapted for driven connection with the drive shaft of the flow meter, and a valve member mounted on the valve shaft and rotatable therewith successively through a sample receiving position interconnecting the inlet port and the accumulator outlet port and a sample releasing position interconnecting the accumulator and container outlet ports; a container valve connected between the container and the container outlet port of the sampling valve, said container valve having open and closed positions; a latch releasably holding the container valve in open position; and a trigger borne by the container engageable with the latch for releasing the same incident to the reception of a predetermined amount of fluid into the container.

6. In combination with a fluid conductor adapted to carry fluid under pressure, a sampling apparatus comprising a body having upper and lower portions and being mounted on the conductor, the body including a substantially cylindrical valve housing, an inlet bore opening into the housing, an accumulator outlet bore communicating with the housing in circumferentially spaced relation to the inlet bore, and a container outlet bore communicating with the housing in downwardly spaced relation to both the inlet and accumulator bores and extended from the housing downwardly of the body, the inlet and accumulator bores being in substantially horizontal alignment; an elongated fluid conducting probe fitted in the inlet bore and extended into the conductor for delivering fluid to the housing substantially at the pressure in the conductor; an elongated accumulator connected to the housing in fluid communication with the accumulator bore for receiving fluid under such conductor pressure and for releasing received fluid at pressure less than such conductor pressure, said accumulator and probe being in substantially horizontal coaxial alignment; an upright container connected to the bore having an upper inlet connected to the container outlet; and valve means in the housing sequentially interconnecting the inlet and accumulator bores and the accumulator and container bores.

7. In a fluid sampler, an accumulator adapted to receive fluid samples under pressure from a source thereof and to discharge such samples under a substantially reduced pressure, a sample container, means for successively connecting such a source of fluid under pressure with the accumulator while substantially isolating the container and connecting the accumulator to the container while substantially isolating the source of fluid, a valve connected between the successive connecting means and the container having open and closed positions, a latch releasably holding the valve in open position, and control means responsive to extent of sample reception by the container operably associated with the latch to release the latch incident to the reception of a predetermined extent of fluid by the container.

8. The device of claim 7 in which the container is mounted for elevational movement and the device includes resilient means in supporting relation to the container, and in which the control means responsive to the extent of sample reception comprises a trigger elevationally movable with the container adapted to release the latch upon descent of the container incident to the accumulated weight of the samples received.

9. An apparatus, for automatically taking fluid samples from a fluid flow meter connected in a fluid flow system and including a drive shaft rotated incident to passage of fluid through the meter, comprising an accumulator adapted to receive fluid samples under high pressure from the fluid flow meter and to discharge such fluid samples under pressure lower than said high pressure; a container for receiving fluid samples under low pressure from the accumulator; a sampling valve adapted to be mounted on the flow meter including an inlet port adapted to be connected in fluid communication with the flow meter and an accumulator outlet port connected in fluid communication with the accumulator, a container outlet port connected in fluid communication with the container, a rotatable valve shaft adapted for driven connection with the drive shaft of the flow meter, and a valve member mounted on the valve shaft and rotatable therewith successively through a sample receiving position interconnecting the inlet port and the accumulator outlet port and a sample releasing position interconnecting the accumulator and container outlet ports; a container valve connected between the container and the container outlet port of the sampling valve, said container valve having open and closed positions; and means responsive to the extent of sample accumulation in the container having controlling connection to the container valve normally holding the container valve in open position but being adapted to close the valve upon the accumulation of a predetermined magnitude of fluid samples in the container.

References Cited in the file of this patent

UNITED STATES PATENTS

| | | |
|---|---|---|
| 1,691,687 | Watts | Nov. 13, 1928 |
| 1,784,547 | Schmidt et al. | Dec. 9, 1930 |
| 2,278,655 | James | Apr. 7, 1942 |
| 2,418,876 | Grace | Apr. 16, 1947 |
| 2,548,193 | Blum | Apr. 10, 1951 |
| 2,611,393 | Gravenhorst | Sept. 23, 1952 |
| 2,719,019 | Fungaroli | Sept. 27, 1955 |
| 2,757,541 | Watson | Aug. 9, 1956 |
| 2,838,292 | Bramming | June 10, 1958 |